(12) United States Patent
Youngquist et al.

(10) Patent No.: US 8,577,639 B2
(45) Date of Patent: Nov. 5, 2013

(54) METHOD AND APPARATUS FOR ACCURATELY CALIBRATING A SPECTROMETER

(75) Inventors: Robert C. Youngquist, Cocoa, FL (US); Stephen M. Simmons, Melbourne, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 322 days.

(21) Appl. No.: 13/031,182

(22) Filed: Feb. 19, 2011

(65) Prior Publication Data

US 2011/0208463 A1 Aug. 25, 2011

Related U.S. Application Data

(60) Provisional application No. 61/307,985, filed on Feb. 25, 2010.

(51) Int. Cl.
*G01J 3/00* (2006.01)
*G01J 3/453* (2006.01)
*G01J 3/45* (2006.01)

(52) U.S. Cl.
USPC .............................. 702/104; 702/85; 356/451

(58) Field of Classification Search
USPC ............. 702/104, 85; 356/451, 452, 453, 455
See application file for complete search history.

(56) References Cited

U.S. PATENT DOCUMENTS

| | | | | |
|---|---|---|---|---|
| 2008/0152353 A1* | 6/2008 | de Boer et al. | ................ | 398/159 |
| 2008/0204759 A1* | 8/2008 | Choi | ............................ | 356/482 |
| 2009/0030632 A1* | 1/2009 | Tallavarjula et al. | ........... | 702/85 |
| 2009/0079980 A1* | 3/2009 | Goulter et al. | ................ | 356/326 |
| 2009/0279074 A1* | 11/2009 | Seaver | ............................ | 356/73 |

OTHER PUBLICATIONS

G. Zhan, K. Oka, T. Ishigaki, and N. Baba, "Birefringent imaging spectrometer." Appl. Opt. 41, No. 4 (Feb. 1, 2002), pp. 734-738.*
"Acquity UPLC Photodiode Array el Detector Getting Started Guide," Waters Corporation, 2009. p. 1-12.*
Youngquist, et al., "Spectrometer Wavelength Calibration using Spectrally Resolved White-Light Interferometry," Optics Letters, vol. 35, Issue 13, pp. 2257-2259, Jul. 1, 2010.

* cited by examiner

*Primary Examiner* — Jonathan C Teixeira Moffat
*Assistant Examiner* — Liam R Casey
(74) *Attorney, Agent, or Firm* — Michelle L. Ford; Nayyer Siddiqi

(57) ABSTRACT

A calibration assembly for a spectrometer is provided. The assembly includes a spectrometer having n detector elements, where each detector element is assigned a predetermined wavelength value. A first source emitting first radiation is used to calibrate the spectrometer. A device is placed in the path of the first radiation to split the first radiation into a first beam and a second beam. The assembly is configured so that one of the first and second beams travels a path-difference distance longer than the other of the first and second beams. An output signal is generated by the spectrometer when the first and second beams enter the spectrometer. The assembly includes a controller operable for processing the output signal and adapted to calculate correction factors for the respective predetermined wavelength values assigned to each detector element.

8 Claims, 3 Drawing Sheets

METHOD AND APPARATUS FOR ACCURATELY CALIBRATING A SPECTROMETER

CROSS-REFERENCE TO RELATED APPLICATION

This application claims the benefit under 35 U.S.C. §119(e) of U.S. Provisional Application Ser. No. 61/307,985, filed Feb. 25, 2010, the contents of which are incorporated herein by reference.

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefor. In accordance with 35 U.S.C. §202, the contractor elected not to retain title.

TECHNICAL FIELD

The present invention relates generally to calibration of an optical instrument, and more particularly, to a method and apparatus for calibration of a spectrometer.

BACKGROUND OF THE INVENTION

A typical spectrometer includes a plurality of detector elements. When the spectrometer is illuminated with radiation having multiple wavelengths, each detector element records an intensity factor for a particular wavelength. The wavelength assignment of each detector element should be the value of the particular wavelength that reaches that detector after passing through the spectrometer optics. In order to determine the wavelength assignment of each detector element, the spectrometer is calibrated using a source that emits radiation at a few known wavelength points in the spectrum. The spectrometer receives the radiation and records an intensity value for the known wavelength points. In order to determine the wavelength assigned to each detector element, a functional fit or polynomial fit is performed to interpolate points within the spectrum and extrapolate points outside the spectrum. However, the wavelength assignments obtained by this method of calibration are typically accurate only to approximately one nanometer.

SUMMARY OF THE INVENTION

A calibration assembly for a spectrometer is provided. The assembly includes a spectrometer having first and second detector elements, the first detector element being assigned a predetermined first wavelength value and the second detector element being assigned a predetermined second wavelength value. A first source emitting first radiation is used to calibrate the spectrometer. A device is placed in the path of the first radiation to split the first radiation into a first beam and a second beam. The assembly is configured so that one of the first and second beams travels a path-difference distance longer than the other of the first and second beams. An actual output signal is generated by the spectrometer when the first and second beams enter the spectrometer. The assembly includes a controller operable for processing the actual output signal. The controller is adapted to calculate first and second correction factors for the respective first and second wavelength values by comparing the actual output signal with a theoretically-predicted output signal.

The calibration assembly allows for wavelength values of each detector element to be determined to within approximately 0.01 nanometers. In a spectrometer having a plurality of detector elements, the calibration assembly allows for each detector element to be calibrated, as opposed to calibrating a few detector elements and interpolating values for the rest of the detector elements as is conventionally done.

The above features and advantages and other features and advantages of the present invention are readily apparent from the following detailed description of the best modes for carrying out the invention when taken in connection with the accompanying drawings.

DETAILED DESCRIPTION OF THE INVENTION

Figure 1:
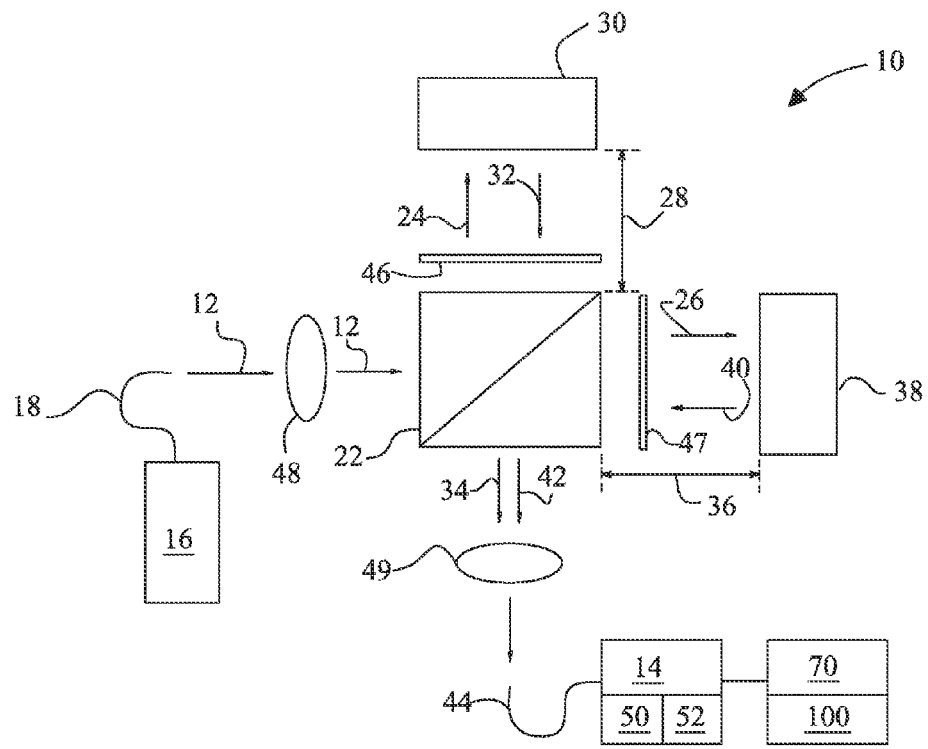
FIG. 1 is a schematic diagram of a calibration assembly for the calibration of a spectrometer.

Referring to the drawings, wherein like reference numbers correspond to like or similar components throughout the several figures, a calibration assembly 10 is shown in FIG. 1. The assembly 10 includes a spectrometer 14 that is to be calibrated using first radiation 12. A first source 16 for generating the first radiation 12 is shown in FIG. 1. The first radiation 12 may be electromagnetic radiation covering the visible spectrum, also known as white light. Alternatively, the first radiation 12 may be broadband radiation, defined here as covering the entire spectrum that the spectrometer 14 has the ability to process. The first source 16 may be operatively connected to a first fiber optic 18 to carry the first radiation 12 away from the first source 16. Any other method of sending and receiving the first radiation 12 may be employed.

Referring to FIG. 1, a device such as a beam splitter 22 is placed in the path of the first radiation 12 to split the radiation into a first beam 24 and a second beam 26. The first beam 24 travels a first distance 28 to a first mirror 30. The first beam 24 is then reflected from the first mirror 30 and re-enters the beam splitter 22, as shown by arrow 32. The first beam 24 passes through the beam splitter 22 and subsequently enters the spectrometer 14, as shown by arrow 34. The second beam 26 travels a second distance 36 to a second mirror 38. The second beam 26 is then reflected from the second mirror 38 and re-enters the beam splitter 22, as shown by arrow 40. The second beam 26 passes through the beam splitter 22 and subsequently enters the spectrometer 14, as shown by arrow 42. The spectrometer 14 records intensity from the first beam 24 and the second beam 26 over a range of wavelengths thereby generating an output signal 210 (described below and shown in FIG. 2). A second fiber optic 44 may be connected to the spectrometer 14 to transport the first and second beams 24, 26 to the spectrometer 14.

The assembly 10 is configured so that the first beam 24 travels a longer distance than the second beam 26 (or vice-versa). The path-difference distance d is defined as the round-trip difference in distance traveled between the first beam 24 and second beam 26. In other words, the distance d is twice the first distance 28 minus twice the second distance 36 (or vice-versa if the second distance 36 is longer than the first distance 28). The first beam 24 may be selectively blocked from entering the spectrometer 14 by a first blocking device 46, shown in FIG. 1. The second beam 26 may be selectively blocked from entering the spectrometer 14 by a second blocking device 47, shown in FIG. 1. A first lens 48 may be used to collimate or focus the first radiation 12 leaving the first source 16, prior to being incident on the beam splitter 22. A second lens 49 may be used to collimate or focus the first and second beams 24, 26 exiting the beam splitter 22. The type of first radiation 12 and beam-splitter 22 can be selected by one of ordinary skill in the art, depending on the type of spectrometer 14 being calibrated and other factors.

The spectrometer 14 includes n detector elements or pixels that are each sensitive to a wavelength $\lambda_i$, where i=1 ... n. A spectrometer 14 with any number of detector elements may be employed. For illustration purposes, the spectrometer 14 is described with respect to two of the n detector elements, a first detector element 50 and a second detector element 52. The first detector element 50 is assigned a first wavelength value $\lambda_1$ and the second detector element 52 is assigned a second wavelength value $\lambda_2$. The first and second wavelength values $\lambda_1$, $\lambda_2$ may be available from the manufacturer of the spectrometer 14, as is readily understood by persons of ordinary skill in the art. Alternatively, the first and second wavelength values $\lambda_1$, $\lambda_2$ may be determined by conventional calibration techniques involving a source with emissions having known wavelength. A functional fit or polynomial fit is performed to interpolate or extrapolate points outside of the known wavelength, as readily understood by persons of ordinary skill in the art.

Figure 5:
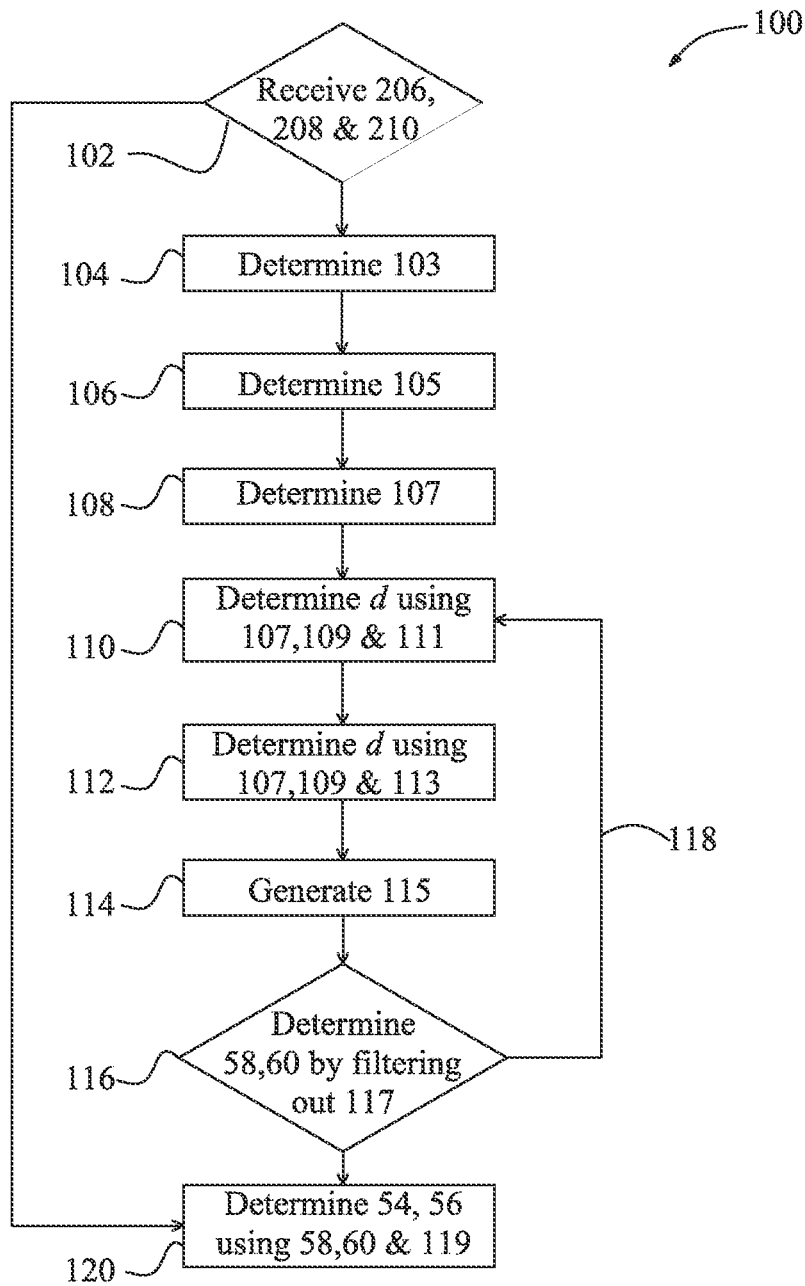
FIG. 5 is a flow chart describing the algorithm for the calibration of the spectrometer shown in FIG. 1.

Referring to FIG. 1, a controller 70 is included in the assembly 10. Controller 70 executes an algorithm 100 which resides within the controller 70 or is otherwise readily executable by the controller 70. FIG. 5 is a flow chart showing the algorithm 100. The controller 70 is adapted to calculate first and second correction factors 54, 56 (shown in step 120 of FIG. 5) for the first and second wavelength values $\lambda_1$, $\lambda_2$. The controller 70 is adapted to process the output of the spectrometer 14 (steps 102, 104, 106, and 108 of FIG. 5). The controller 70 may be a general-purpose digital computer, a microprocessor, central processing unit, or a computer-readable storage medium.

Part 1—Obtaining an Actual Normalized Output

Figure 2:
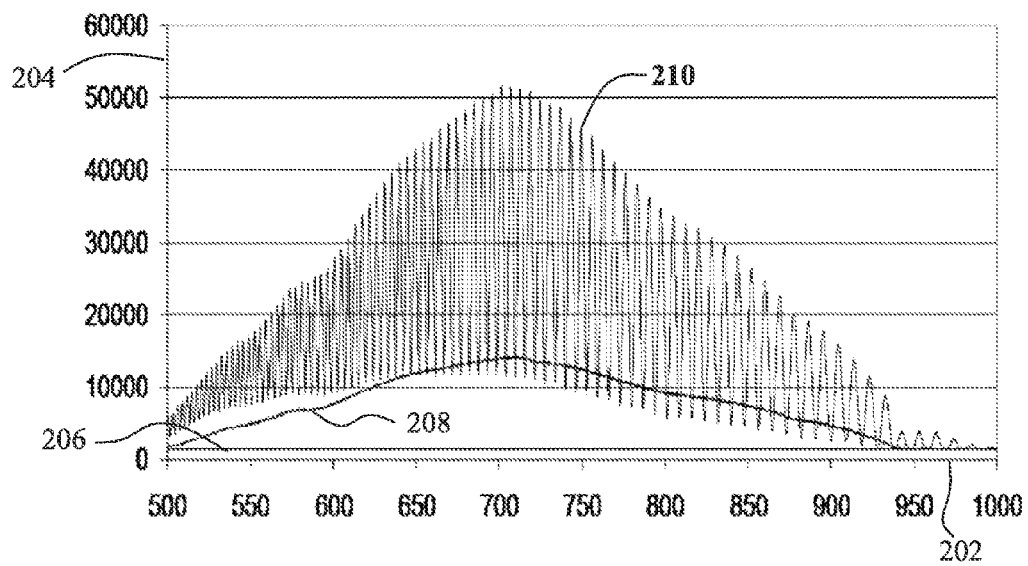
FIG. 2 is a graph illustrating an example of signal received from the spectrometer of FIG. 1.

When the first radiation 12 enters the spectrometer 14, a signal intensity is detected at each detector element n. FIG. 2 is a graph illustrating an example of a signal received from the spectrometer 14. The x-axis 202 represents wavelength in nanometers and the y-axis 204 represents intensity in arbitrary units. In this case, the output from the spectrometer 14 was integrated over 2-3 milliseconds and the measurement repeated every 3 seconds. The time for repeating the measurement and integration of signal may be varied according to the particular application. The signal received will differ depending on the type of source, beam-splitting device, and spectrometer used.

Referring to FIG. 2, a dark signal 206 is obtained when both the first and second beams 24, 26 are blocked. The dark signal 206 represents the background noise of the system. A reference signal 208 is obtained when the first beam 24 is blocked and the second beam 26 is transmitted to the spectrometer 14. Alternatively, the second beam 26 may be blocked and the first beam 24 is transmitted to the spectrometer 14. An output signal 210 is obtained when both the first beam 24 and second beam 26 are received at the spectrometer 14. The output signal 210 is oscillatory as a result of interference of the first and second beams 24, 26 traveling along different paths.

Referring to FIG. 5, the algorithm 100 begins with step 102, where the controller 70 receives the output signal 210, reference signal 208 and dark signal 206. At step 104, the controller 70 determines a dark-corrected reference signal 103 by subtracting the dark signal 206 from the reference signal 208. At step 106, the controller 70 determines a dark-corrected output signal 105 by subtracting the dark signal 206 from the output signal 210. At step 108, the controller 70 determines an actual normalized output 107 by dividing the dark-corrected output signal 105 by the dark-corrected reference signal 103.

The actual normalized output 107 for the first and second detectors 50, 52 is represented by the array [$P(\lambda_1)$, $P(\lambda_2)$], which is data obtained at the spectrometer 14. The actual normalized output 107 determined above is compared to a theoretically predicted normalized output 109. The predicted normalized output 109 for the first and second detectors 50, 52 is assumed to be represented by the array [(1+cos($2\pi d/\lambda_1$)), (1+cos($2\pi d/\lambda_2$))], where d is the path-difference distance between the first and second beams 24, 26. It is assumed that the difference between the predicted normalized output 109 and the actual normalized output 107 obtained by the spectrometer 14 represents wavelength assignment errors. This difference is used to calculate the first and second correction factors 54, 56 for the first and second wavelength values $X_1$, $X_2$, respectively.

Part 2—Correlation Process To Determine Path-Difference Distance

In order for the controller 70 to obtain the first and second correction factors 54, 56, a determination of the path-difference distance d is required. A correlation process described below is carried out to determine the path-difference distance d. An alternative method to determine the path-difference distance d may be substituted.

At step 110, the controller 70 correlates the actual normalized output 107 with a correlation function represented by the array [(cos($2\pi z/\lambda_1$))/$\lambda_1$, (cos($2\pi z/\lambda_2$))/$\lambda_2$], having a variable parameter z. The correlation process is as follows: the actual normalized output 107 is multiplied by the correlation function and integrated for all detector elements to obtain a first function 111. For a system with n detectors, the first function 111 is $\Sigma_{i=1\ to\ n} P(\lambda_i)\cos(2\pi z/\lambda_i)(\Delta\lambda_i/\lambda_i)$, where the $P(\lambda_i)$ are the n spectral power measurements obtained from the normalization process described in step 108. The predicted normalized output 109 for the first and second detectors 50, 52, represented by the array [(1+cos($2\pi d/\lambda_1$)), (1+cos($2\pi d/\lambda_2$))], is then plugged into the first function 111. The controller 70 then determines a peak value or maximum value for the first function 111, which occurs when the variable parameter z is equal to d. This is readily understood by one of ordinary skill in the art since the first function 111 will have a square of a cosine parameter when z is equal to d (the square of a cosine is always a non-negative number between 0 and 1 (inclusive), whereas a cosine is always between −1 and 1 (inclusive). The value of d determined here is a first-approximation of the path-difference distance because the range of integration is finite. In other words, the range of integration is limited to the shortest, $\lambda_1$, and the longest wavelengths, $\lambda_n$, that have significant signal.

At step 112, the controller 70 adds an integration correction factor to the first function 111 to obtain a second function 113. For a system with i=1 . . . n detectors, the second function 113 is:

$$\Sigma_{i=1\ to\ n} P(\lambda_i)\cos(2\pi z/\lambda_i)(\Delta\lambda_i/\lambda_i) - [Ci(2\pi z/\lambda_1) - Ci(2\pi z/\lambda_n)] - [Ci(4\pi z/\lambda_1) - Ci(4\pi z/\lambda_n)]/4,$$

where the $P(\lambda_i)$ are the n spectral power measurements obtained from the normalization process described in step 108. In the second function 113, Ci is the cosine integral function which is readily understood by those of ordinary skill in the art. The second function 113 is adapted to correct for integration errors. The correlation process described above is repeated with the second function 113, using the approximate value for d as a starting point. The controller 70 searches for a peak or maximum value of the second function 113, which occurs when the variable parameter z is equal to the correct path-difference d. Thus a value of the path-difference distance d is determined.

Part 3—Using Path-Difference Distance to Determine Preliminary Correction Factors Using the path-difference distance d determined in step 112, a preliminary first correction factor 58 ($\eta_1$) for the first wavelength value $\lambda_1$ and a preliminary second correction factor 60 ($\eta_2$) for the second wavelength value $\lambda_2$ may be obtained. The preliminary first and second correction factors 58, 60 [$\eta_1,\eta_2$] are related to the first and second correction factors 54, 56 (the relationship is described in step 120 below).

In step 114, the controller 70 multiplies the cosine portion [$\cos(2\pi d/\lambda_1)$, $\cos(2\pi d/\lambda_2)$] of the predicted normalized output 109 with an ideal function [$\sin(2\pi d\lambda_1/(\lambda_1+\eta_1))$, $\sin(2\pi d\lambda_2/(\lambda_2+\eta_2))$], resulting in the generation of a third function 115. As noted above, the predicted normalized output 109 for the first and second detectors 50, 52 is represented by the array [$(1+\cos(2\pi d/\lambda_1))$, $(1+\cos(2\pi d/\lambda_2))$], where d is the path-difference distance between the first and second beams 24, 26. For a system with i=1 . . . n detectors, the third function 115 can be represented as:

$$\{\cos(2\pi d/\lambda_i)\cdot\sin(2\pi d\lambda_i/(\lambda_i+\eta))\},$$

which is approximately equal to $\{-(\frac{1}{2})\sin(2\pi d\eta_i/\lambda_i^2)+(\frac{1}{2})\sin(4\pi d/\lambda_i)\}$.

Figure 3:
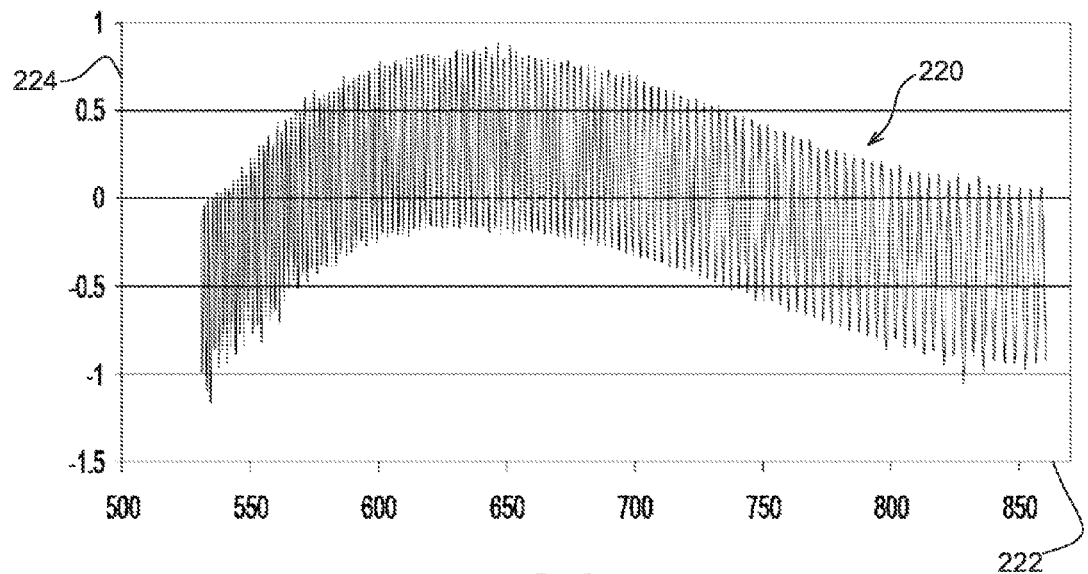
FIG. 3 is a graph illustrating an example of an intermediate function determined according to an algorithm stored in the controller of the calibration assembly of FIG. 1.

The third function 115 includes a high-frequency oscillatory term 117 (($\frac{1}{2}$)$\sin(4\pi d/\lambda_i)$). The term ($-(\frac{1}{2})\sin(2\pi d\eta_i/\lambda_i^2)$) is a drift term. FIG. 3 is a graph illustrating an example 220 of a third function 115 having both an oscillatory term 117 and a drift term, as described above. The x-axis 222 represents wavelength in nanometers and the y-axis 224 represents arbitrary units.

In step 116, the oscillatory term 117 (($\frac{1}{2}$)$\sin(4\pi d/\lambda_i)$) is averaged out or filtered out, leaving only the drift term $(-(\frac{1}{2})\sin(2\pi d\eta_i/\lambda_i^2))$. Techniques for averaging out oscillatory terms are known to those of ordinary skill in the art. For example, digital filtering methods, Fourier transformation methods or sliding filter methods may be used. In the sliding filter method, adjacent maximum and minimum values are averaged out and this is repeated for each point in the spectrum. Any suitable method for filtering out the oscillatory terms may be used. Since the path-difference distance d is known from step 112, the preliminary first and second correction factors 58, 60 [$\eta_1,\eta_2$] can be determined.

In step 118, the preliminary first and second correction factors 58, 60 [$\eta_1,\eta_2$] determined in step 116 are applied to the first and second wavelength values $\lambda_1$, $\lambda_2$ and steps 110, 112, 114 and 116 are repeated. A revised preliminary first correction factor 58 ($\eta_1$) and a revised preliminary second correction factor 60 ($\eta_2$) is generated.

Figure 4:
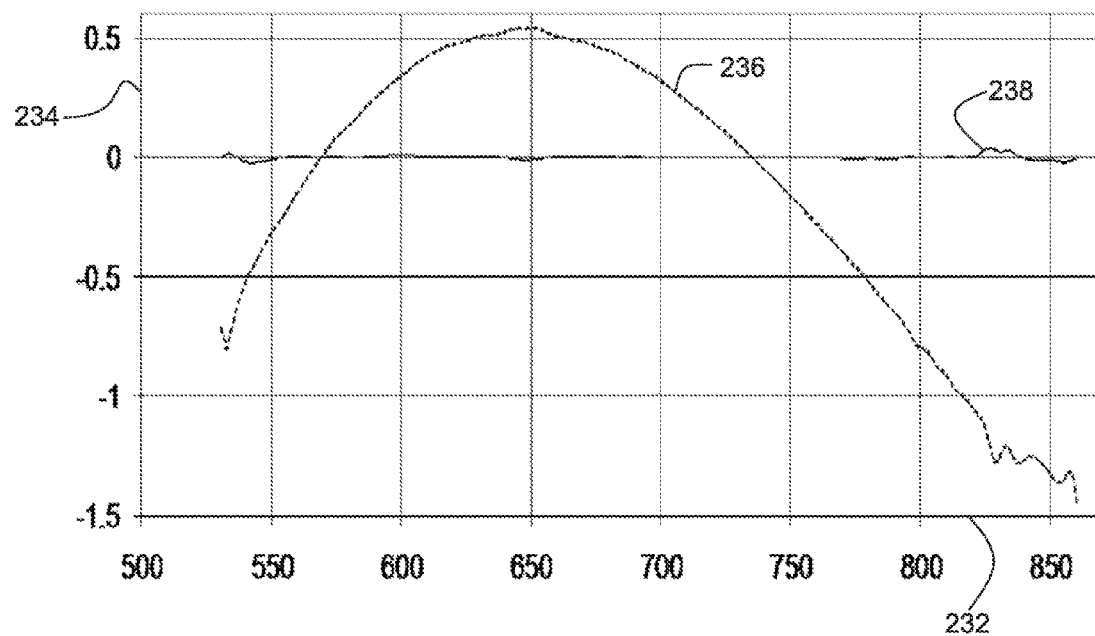
FIG. 4 is a graph illustrating an example of preliminary correction factors determined according to the algorithm stored in the controller of the calibration assembly of FIG. 1.

FIG. 4 is a graph illustrating an example of preliminary correction factors 58, 60 that were calculated by the controller 70 for the spectrometer 14. The x-axis 232 represents wavelength in nanometers and the y-axis 234 represents preliminary correction factor in nanometers. The preliminary correction factor varies for each detector element (assigned to a particular wavelength). A first-approximation trace 236 shows preliminary correction factors obtained in accordance with step 116. The first-approximation trace 236 shows a maximum preliminary correction factor of approximately 1.5 nanometers, at the detector element assigned to about 850 nanometers. A second-approximation trace 238 shows preliminary correction factors obtained in accordance with step 118, in other words, repeating steps 110, 112, 114, and 116. As shown in FIG. 4, the preliminary correction factors in the second-approximation trace 238 are less than 0.01 nanometers in magnitude across the spectrum. Thus the algorithm 100 allows for wavelength values to be corrected to within approximately 0.01 nanometers.

Part 4—A Fixed-Offset Correction to Obtain Correction Factors

A next step may be employed to further refine the preliminary first and second correction factors 58, 60 [$\eta_1,\eta_2$]. Because the above calculations involve a normalization and smoothing process, the first and second wavelength values $\lambda_1$, $\lambda_2$ may be biased in one direction or another, either too large or too small. A fixed-offset error 119 is calculated to compensate for this effect. The fixed-offset error 119 may be described by the function [$1/(1+\delta)$], where $\delta$ may be a positive or negative number. The fixed-offset error 119 may be calculated using a source with at least one known wavelength. A suitable alternative for finding the fixed-offset error 119 may be substituted.

The corrected wavelength value for n detector elements can be represented by ($\lambda_i+\epsilon_i$), where i=1 . . . n. In step 120, the controller 70 calculates the first and second correction factors [$\epsilon_1, \epsilon_2$] for the first and second wavelength values [$\lambda_1, \lambda_2$] of the first and second detector elements 50, 52, respectively. The first and second correction factors 54, 56 [$\epsilon_1, \epsilon_2$] are determined by applying the fixed-offset error ($1/(1+\delta)$) to the preliminary first and second correction factors 58, 60 [$\eta_1, \eta_2$]. The relationship can be represented by: ($\lambda_i+\epsilon_i=(\lambda_i+\eta_i)/(1+\delta)$). Simplifying this further results in: ($\epsilon_i=\eta_i-\delta\lambda_i$). Therefore the first and second correction factors 54, 56 [$\epsilon_1, \epsilon_2$] are [$\eta_1-\delta\lambda_1, \eta_2-\delta\lambda_2$]. The preliminary first and second correction factors 58, 60 [$\eta_1,\eta_2$] were determined previously.

Figure 6:
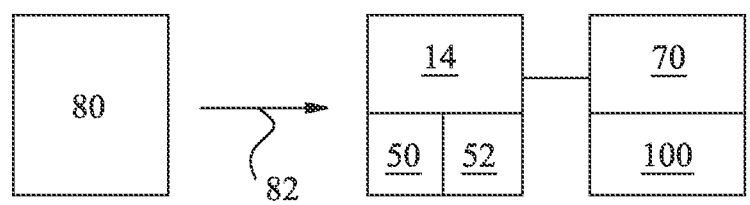
FIG. 6 is a schematic diagram of a second source of radiation used for the calibration of the spectrometer shown in FIG. 1.

Referring to FIG. 6, the $\delta$ factor is calculated using a second source 80 configured to emit second radiation 82 having a known-wavelength $\lambda_{known}$. FIG. 6 is a schematic diagram of the second source 80. For example, the second source 80 may be a laser with emissions centered around one known wavelength. The second radiation 82 from the second source 80 enters the spectrometer 14 and a peak is detected at a detected-wavelength $\lambda_{detected}$. The $\delta$ factor is calculated by comparing the known-wavelength $\lambda_{known}$ and the detected-wavelength $\lambda_{detected}$ since $\lambda_{known}=\lambda_{detected}(1/(1+\delta))$.

While the best modes for carrying out the invention have been described in detail, those familiar with the art to which this invention relates will recognize various alternative designs and embodiments for practicing the invention within the scope of the appended claims.

The invention claimed is:

1. A calibration assembly for a spectrometer, the assembly comprising:
a spectrometer having first through one hundredth detector elements, each of the first through one hundredth detector elements being assigned predetermined respective wavelength values ($\lambda_1, \lambda_2, \ldots \lambda_{100}$);
a first source emitting a first radiation for calibrating the spectrometer;
a device placed in the path of the first radiation to split the first radiation into a first beam and a second beam;
wherein one of the first and second beams travels a path-difference distance (d) longer than the other of the first and second beams;
wherein the spectrometer is configured to generate an actual output signal when the first beam and the second beam enter the spectrometer;
a controller operable for processing the actual output signal;
wherein the controller is adapted to calculate respective correction factors for the respective wavelength values by comparing the actual output signal with a theoretically-predicted output signal;
a first blocking device to selectively block the first beam and a second blocking device to selectively block the second beam;
wherein the spectrometer is configured to generate a reference signal when the first beam is selectively blocked and the second beam enters the spectrometer;
wherein the spectrometer is configured to generate a dark signal when the first beam and the second beam are selectively blocked from entering the spectrometer;
an algorithm stored on and executable by the controller to cause the controller to:
determine a dark-corrected reference signal by subtracting the dark signal from the reference signal;
determine a dark-corrected output signal by subtracting the dark signal from the output signal;
determine an actual normalized output by dividing the dark-corrected output signal by the dark-corrected reference signal;
correlate the actual normalized output with a correlation function to determine a first function, the correlation function and the first function having a variable parameter z;
determine a first-approximation for the path-difference distance (d) occurring at a maximum value for the first function;
add an integration correction factor to the first function to obtain a second function; and
determine the path-difference distance between the first beam and the second beam, the path-difference distance occurring at a maximum value for the second function;
wherein the correlation function is represented by an array $[(\cos(2\pi z/\lambda_1))/\lambda_1, (\cos(2\pi z/\lambda_2))/\lambda_2, \ldots, \cos(2\pi z/\lambda_{100}))/\lambda_{100}]$; and
wherein the first function is approximated by an expression $\{\Sigma_{i=1 \text{ to } 100}[(1+\cos(2\pi d/\lambda_i))] \cos(2\pi z/\lambda_i)(\Delta\lambda_i/\lambda_i)\}$, such that $\Delta\lambda_i$ is a spacing between respective wavelengths.

2. The assembly of claim 1, further comprising:
a first mirror positioned such that the first beam travels a first distance to the first mirror to be reflected towards the spectrometer;
a second mirror positioned such that the second beam travels a second distance to the second mirror to be reflected towards the spectrometer; and
wherein the device placed in the path of the first radiation is a beam splitter.

3. The assembly of claim 1, further comprising:
a first lens adapted to collimate the first radiation emitted by the source prior to the first radiation entering the beam splitter; and
a second lens adapted to collimate the first and second beams prior to the first and second beams entering the spectrometer.

4. The assembly of claim 1, wherein execution of the algorithm causes the controller to:
multiply the predicted normalized output with a predetermined ideal function to generate a third function having an oscillatory term and a drift term;
filter out the oscillatory term; and
calculate respective preliminary correction factors for the respective wavelength values.

5. The assembly of claim 4, further comprising:
a second source configured to emit second radiation having at least one known-wavelength, the second radiation generating a signal at a detected-wavelength at the spectrometer;
wherein execution of the algorithm causes the controller to:
calculate a fixed-offset error by comparing the detected-wavelength with the known-wavelength; and
calculate the respective correction factors for the respective wavelength values by applying the fixed-offset error to the respective preliminary correction factors.

6. A method of calibrating a spectrometer having first through one hundredth detector elements, the method comprising:
assigning pre-determined first and second respective wavelength values ($\lambda_1, \lambda_2, \ldots \lambda_{100}$) to the first through one hundredth detector elements;
illuminating the spectrometer with a first radiation emitted by a first source;
splitting the first radiation into a first beam and a second beam such that one of the first and second beams travels a path-difference distance (d) longer than the other of the first and second beams;
generating an actual output signal at the spectrometer when the first beam and the second beam enter the spectrometer;
calculating respective correction factors for the respective wavelength values by comparing the actual output signal with a theoretically-predicted output signal;
selectively blocking the first beam with a first blocking device;
selectively blocking the second beam with a second blocking device;
generating a dark signal at the spectrometer when both the first beam and second beam are blocked;
generating a reference signal at the spectrometer when one of the first and second beams is blocked;
subtracting the dark signal from the actual output signal to produce a dark-corrected output signal;
subtracting the dark signal from a reference signal to produce a dark-corrected reference signal;
dividing the dark-corrected output signal by the dark-corrected reference signal to produce an actual normalized output;

correlating the actual normalized output with a correlation function to determine a first function, the correlation function and the first function having a variable parameter z;

determining a first-approximation for the path-difference distance occurring at a maximum value of the first function;

wherein the correlation function is represented by the array $[(\cos(2\pi z/\lambda_1))/\lambda_1, (\cos(2\pi z/\lambda_2))/\lambda_2, \ldots, \cos(2\pi z/\lambda_{100}))/\lambda_{100}]$;

wherein the first function is approximated by an expression $\{\Sigma_{i=1\,to\,100}[(1+\cos(2\pi d/\lambda_i))]\cos(2\pi z/\lambda_i)(\Delta\lambda_i/\lambda_i)\}$, such that $\Delta\lambda_i$ is a spacing between respective wavelengths;

adding an integration correction factor to the first function to obtain a second function; and determining the path-difference distance between the first beam and the second beam, the path-difference distance occurring at a maximum value of the second function.

7. The method of claim 6, further comprising:

multiplying the predicted normalized output with a predetermined ideal function to generate a third function having an oscillatory term and a drift term;

filtering out the oscillatory term; and calculating a respective preliminary correction factor for the respective wavelength values.

8. The method of claim 7, further comprising:

configuring a second source to emit second radiation having at least one known-wavelength, wherein the second radiation generates a signal at a detected-wavelength at the spectrometer;

calculating a fixed-offset error by comparing the detected-wavelength with the known-wavelength; and calculating the respective correction factors for the respective wavelength values respectively by applying the fixed-offset error to the respective preliminary correction factors.

* * * * *